United States Patent [19]
Kuroda et al.

[11] Patent Number: 5,577,383
[45] Date of Patent: Nov. 26, 1996

[54] APPARATUS FOR CONTROLLING INTERNAL COMBUSTION ENGINE

[75] Inventors: Osamu Kuroda; Hisao Yamashita; Akio Honji, all of Hitachi; Noriko Watanabe, Mito; Toshio Ogawa, Takahagi; Hiroshi Miyadera, Hitachi; Takeshi Atago, Katsuta, all of Japan

[73] Assignee: Hitachi, Ltd., Tokyo, Japan

[21] Appl. No.: 351,167

[22] Filed: Nov. 30, 1994

Related U.S. Application Data

[63] Continuation-in-part of Ser. No. 948,264, Sep. 21, 1992, abandoned.

[30] Foreign Application Priority Data

Sep. 20, 1991 [JP] Japan ..................... 3-241671

[51] Int. Cl.⁶ ..................................... F01N 3/20
[52] U.S. Cl. .................. 60/284; 60/285; 60/289
[58] Field of Search .................. 60/284, 285, 289, 60/307

[56] References Cited

U.S. PATENT DOCUMENTS

| | | | |
|---|---|---|---|
| 3,757,521 | 9/1973 | Tourtellotte et al. | 60/286 |
| 3,791,143 | 2/1974 | Keith et al. | 60/284 |
| 3,799,134 | 3/1974 | Griese | 60/285 |
| 3,809,743 | 5/1974 | Unland et al. | 60/301 |
| 3,943,709 | 3/1976 | Holt | 60/284 |
| 3,949,551 | 4/1976 | Eichler et al. | 60/284 |
| 4,165,610 | 8/1979 | Iizuka et al. | 60/284 |
| 4,209,981 | 7/1980 | Miyamori et al. | 60/284 |
| 4,274,381 | 6/1981 | Abo | 60/285 |
| 5,007,237 | 4/1991 | Müller | 60/285 |
| 5,050,551 | 9/1991 | Morikawa | 60/285 |

FOREIGN PATENT DOCUMENTS

| | | |
|---|---|---|
| 1205980 | 6/1986 | Canada . |
| 0417412 | 3/1991 | European Pat. Off. . |
| 422432 | 4/1991 | European Pat. Off. . |
| 4037183 | 11/1990 | Germany . |
| 4106249 | 2/1991 | Germany . |
| 54-79319 | 6/1979 | Japan . |
| 58-72632 | 4/1983 | Japan . |
| 61-58912 | 3/1986 | Japan . |
| 1-83817 | 3/1989 | Japan . |
| 1-227815 | 9/1989 | Japan . |

OTHER PUBLICATIONS

German Magazine: Grobman et al., ATZ Automobile-Technische Zeitschrift 75, 1973, 4, pp. 140–143.

Primary Examiner—Leonard E. Heyman
Attorney, Agent, or Firm—Antonelli, Terry, Stout & Kraus

[57] ABSTRACT

An apparatus for purifying an exhaust gas emitted from an internal combustion engine, particularly, immediately after starting of the engine, includes a mechanism for reducing the time required to heat a catalyst converter to the activation temperature. The exhaust gas is passed through a preliminary catalyst close to the engine and then through a main catalyst downstream of the catalyst. The engine is operated with an air-fuel mixture which is richer than the amount indicated by the stoichiometric air/fuel ratio for a period of time from when engine is started until the main catalyst is heated to a temperature at which the catalyst can sufficiently perform its purifying capability. The preliminary catalyst is enabled to function at lower temperatures by combusting the exhaust gas which is generated during a rich air-fuel mixture condition. The main catalyst can be heated with the generated combustion heat, resulting in an enhancement in exhaust gas purifying capability.

18 Claims, 7 Drawing Sheets

APPARATUS FOR CONTROLLING INTERNAL COMBUSTION ENGINE

CROSS-REFERENCE TO RELATED APPLICATION

This application is a continuation-in-part of our prior U.S. application Ser. No. 07/948,264, filed Sep. 21, 1992, now abandoned.

BACKGROUND OF THE INVENTION

The present invention relates to an apparatus for controlling an internal combustion engine, and in particular to an apparatus for controlling an internal combustion engine which is capable of effectively purifying harmful components in an exhaust gas emitted from the engine at the initial phase of starting of the engine with a purifying catalyst disposed in an exhaust system. In a broad aspect, the invention relates to an apparatus for controlling the amount of a fuel supplied to an internal combustion engine.

The exhaust gas emitted from internal combustion engines contains harmful components, such as carbon monoxide (CO), hydrocarbons (HC) and nitrogen oxides (NOx). These harmful components have an adverse influence upon the human body as air pollutants and hinder the growth of plants.

In order to reduce the amount of these harmful components contained in the exhaust gas emitted from an internal combustion engine, researches for purifying the exhaust gas emitted from internal combustion engines have been conducted to provide in exhaust system of the engine with an exhaust gas purifying catalytic converter including a three way catalyst to remove pollutants exhaust gas.

Although the amount of the harmful components in the exhaust gas can be reduced by providing the exhaust system with an exhaust gas purifying catalytic converter, the exhaust gas purifying ability is exhibited only after the catalyst has been elevated to a temperature at which it becomes active. The exhaust gas purifying ability of the catalyst before activation is very low so that harmful components are discharged into the atmosphere until the catalyst is heated to a temperature at which it becomes active.

The temperature at which the exhaust gas purifying catalyst becomes active depends upon the composition of the catalyst and is usually 250° to 400° C. as described in Japanese Unexamined Patent Publication Tokkai-Sho 54-16018.

Approximately two minutes or a longer period of time is normally required for the catalyst gas to be heated to 250° to 400° C. following the starting of an engine. Some literature, such as Japanese Unexamined Patent Publication Tokkai-Sho 54-79319, say that it takes 3 to 5 minutes.

Therefore, it is important matter to determine how to effectively purify the harmful components in an engine exhaust gas emitted during the several minutes following starting of the engine until the catalyst is heated to an active temperature.

SUMMARY OF THE INVENTION

It is an object of the present invention to provide an apparatus for controlling an internal combustion engine in which the temperature of an exhaust gas purifying catalyst can be elevated to a catalyst activation temperature immediately after starting of the engine.

The present invention provides an apparatus for controlling an internal combustion engine including a fuel injection valve and an air amount adjusting valve which are disposed in an air intake system and an exhaust gas purifying catalyst which is disposed in an exhaust system, comprising means to which the temperature of said exhaust gas purifying catalyst disposed in said exhaust system is input for controlling the fuel injection valve and the air amount adjusting valve in said air intake system to make the air-fuel mixture richer than the amount determined by the stoichiometric air/fuel ratio when the input temperature is lower thana preset value.

The preset value of the temperature of the exhaust gas purifying catalyst is a temperature at which the catalyst becomes active. When the temperature of the exhaust gas purifying catalyst in the engine exhaust system is lower than the catalyst activation temperature, the amount of the supplied fuel is increased or the amount of intake air is decreased to make the air-fuel mixture richer than the amount determined by the stoichiometric air/fuel ratio to change the components in the exhaust gas so that the catalyst temperature can be quickly elevated.

Specifically, the components in the engine exhaust gas are changed with the air/fuel ratio. If the engine is operated under a condition in which the air-fuel mixture is richer than the amount determined by the stoichiometric air/fuel ratio, a large amount carbon monoxide is generated and a relatively large amount of hydrocarbons are generated. It is to be noted that several to ten and higher % of carbon monoxide, which is remarkably higher than the concentration of the hydrocarbons, is contained in the exhaust gas.

When the engine is operated at an air/fuel ratio of 14.7 (A/F wherein A and F represent air and fuel weights, respectively), carbon monoxide is lower than 1% in amount.

Carbon monoxide is burnt at a considerably lower temperature than are hydrocarbons. Accordingly, if the engine intake system is supplied with an air-fuel mixture which is richer than the amount determined by the stoichiometric air/fuel ratio, carbon monoxide can be burnt with a catalyst even if the temperature of the exhaust gas is low. The temperature of the catalyst can be elevated by the heat generated due to this combustion.

If the engine is operated under a condition in which the air-fuel mixture is richer than the amount determined by the stoichiometric air/fuel ratio, a considerably larger amount of hydrocarbons would be generated. The amount of the generated heat per unit weight of the hydrocarbons is 5 times as much as that of carbon monoxide.

If the air-fuel mixture is made richer than the amount determined by the stoichiometric air/fuel ratio, catalyst combustion of hydrocarbons is performed in addition to the catalyst combustion of carbon monoxide so that the temperature of the catalyst can be quickly elevated.

As a result of this, harmful components in the exhaust gas can be effectively eliminated by quickly elevating the catalyst temperature even at the initial phase of starting of the engine.

In another aspect of the present invention, there is provided an apparatus for controlling an internal combustion engine including a fuel injection valve and an air amount adjusting valve which are disposed in an air intake system and an exhaust gas purifying catalytic converter which is disposed in an exhaust system, comprising means to which the temperature of said exhaust gas purifying catalyst disposed in said exhaust system is input for comparing the input temperature with a temperature preset value; means for generating a signal to make an air-fuel mixture richer than the amount determined by the stoichiometric air/fuel ratio when the temperature of said exhaust gas purifying catalyst is lower than the temperature preset value; and control means for opening or closing said fuel injection valve and said air amount adjusting valve in said air intake system in response to said signal.

In a further aspect of the present invention, there is provided an apparatus for controlling an internal combustion engine including a fuel injection valve and an air amount adjusting valve which are disposed in an air intake system and an exhaust gas purifying catalyst which is disposed in an exhaust system, comprising means for inputting the temperature of a catalyst in said exhaust gas purifying catalyst disposed in said exhaust system; means for storing a preset value of the temperature of said exhaust gas purifying catalyst therein; means for comparing the temperature of the catalyst in said catalytic converter from said input means with the preset temperature value of said storing means; means for generating a signal to make an air-fuel mixture richer than the amount determined by the stoichiometric air/fuel ratio when the temperature of said exhaust gas purifying catalyst is lower than said temperature preset value; and control means for opening or closing said fuel injection valve and said air amount adjusting valve in said air intake system in response to said signal.

When the temperature of the exhaust gas purifying catalyst is lower than a preset value, it is preferable to drive to open or close the fuel injection valve and the air amount adjusting valve in the air intake system so that the air/fuel ratio A/F (A and F represent air and fuel weights, respectively) is not lower than 10 and not higher than 13.

When the temperature of the exhaust gas purifying catalyst disposed in the exhaust system is higher than the preset value, it is preferable to drive to open or close the fuel injection valve and the air amount adjusting valve in the air intake system so that the air/fuel ratio is equal or approximate to the stoichiometric air/fuel ratio. Both of the above mentioned controls can be performed by using a microcomputer.

DESCRIPTION OF PREFERRED EMBODIMENTS

Figure 1:
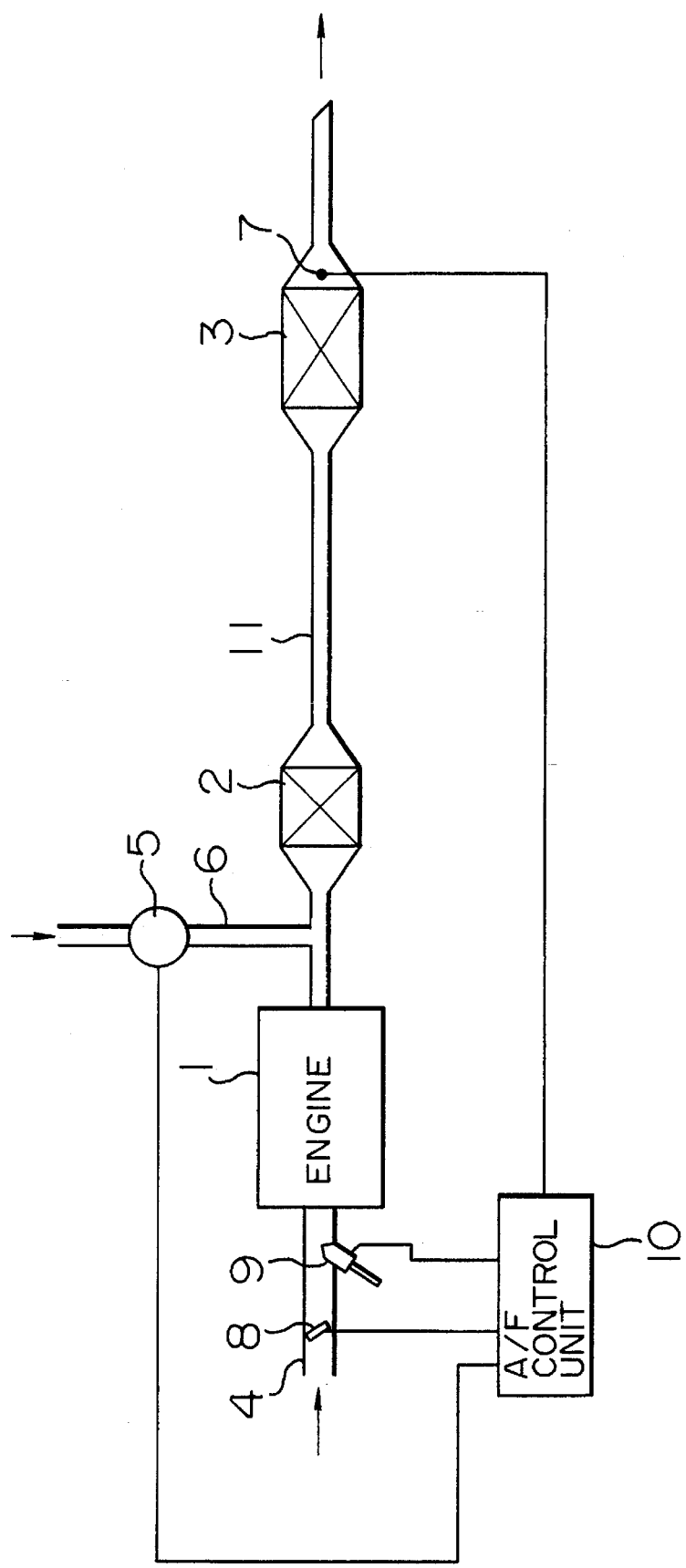
FIG. 1 is a schematic view showing an embodiment of a system for purifying an exhaust gas from an internal combustion engine.

The present invention is applicable to an internal combustion engine having a fuel injection valve and an air amount adjusting valve in an air intake system and having a combustion catalyst and a three way catalyst in an exhaust system. In this case, it is preferable to dispose the combustion catalyst before the three way catalyst. By making the air-fuel mixture richer than the amount determined by the stoichiometric air/fuel ratio, the temperature of the exhaust gas purifying catalyst can be quickly elevated by the combustion heat generated by the combustion catalyst.

The present invention is also applicable to an internal combustion engine having a fuel injection valve and an air amount adjusting valve in an air intake system and having a combustion catalyst and an exhaust gas purifying catalyst in an exhaust system and having air supplying means at the previous stage of said combustion catalyst. Since the concentration of oxygen in the exhaust gas is low if the engine is operated under a condition in which the air-fuel mixture is richer than the amount determined by the air/fuel ratio, oxygen may be insufficient when carbon monoxide and hydrocarbons in the exhaust gas are burnt with the catalyst. This problem of insufficient oxygen is overcome by supplying air to the exhaust system when the engine is operated under a condition in which the air-fuel mixture is richer than the amount determined by the stoichiometric air/fuel ratio. Such a control of air can be also carried out by the control apparatus of the present invention.

A system for purifying exhaust gas in an internal combustion engine control apparatus of the present invention will now be described.

Such a system for purifying exhaust gas from an internal combustion engine has a fuel injection valve and an air amount adjusting valve, such as a throttle valve, in an air intake system and a preliminary catalyst, including a combustion catalyst and an exhaust gas purifying main catalyst, in an exhaust system and comprises means for detecting the temperature of the exhaust gas purifying main catalyst and means (control unit) for opening or closing the fuel injection valve and the air amount adjusting valve so that the air-fuel mixture becomes richer than the amount determined by the stoichiometric air/fuel ratio for a period of time from when the engine is started until the exhaust gas purifying main catalyst is heated to a temperature at which the catalyst becomes active.

It is preferable to open or close the fuel injection valve and an air amount adjusting valve so that the air-fuel mixture becomes richer than the amount determined by the stoichiometric air/fuel ratio for a period of time from when the engine is started until the exhaust gas purifying main catalyst is heated to a temperature at which the catalyst becomes active and so that the air/fuel ratio is made equal or approximate to the stoichiometric air/fuel ratio when the temperature of the exhaust gas purifying main catalyst reaches a temperature at which the catalyst becomes active.

It is preferable that the air/fuel ratio A/F wherein A and F represent air and fuel weights, respectively, be not lower than 10 and not higher than 13 under a fuel rich condition. Particularly, it is preferable to supply a richer air-fuel mixture under such a condition that the CO concentration of the engine exhaust gas is not lower than 3 and not higher than 14.

In order to carry out the present invention, it is preferable to provide the exhaust gas purifying main catalyst, for example, below the floor of an automobile and to provide the preliminary catalyst including a combustion catalyst in a position as close as possible to the engine. The temperature of the engine exhaust gas is lowered as it flows through the exhaust gas passage. Providing the preliminary catalyst in a position as close as possible to the engine enables the exhaust gas to be introduced to the catalysts while the temperature of the exhaust gas is not lowered. Making the preliminary catalyst of the combustion catalyst can enhance the oxidation activity of CO and HC.

It is preferable to provide means for adding an oxidizing agent, such as air, in the exhaust gas passage upstream of the preliminary catalyst.

The oxygen contained in the exhaust gas which is generated by combustion in a fuel rich condition is generally low in concentration. Accordingly, adding an oxygen containing gas, such as air, at the previous stage of the preliminary catalyst causes the combustion of CO and HC in the preliminary catalyst to effectively occur.

It is preferable that the amount of the added air (oxygen) be equivalent to or slightly more than the stoichiometric oxygen consuming amount of the exhaust gas. In this case, both combustion in the preliminary catalyst and the exhaust gas purifying main catalyst can be performed in an excellent manner.

It is preferable that the preliminary catalyst be a combustion catalyst having an activity in oxidation of both CO and HC. Specifically, it is preferable to use as a catalyst activating component at least one metal or metal oxide thereof which is selected from the group of VIII group, and Ib group in the Periodic Table, rare earth metals, Zinc and Tin.

It is preferable to use as the exhaust gas purifying main catalyst a three way catalyst which exhibits activity in oxidation of CO and HC and in reduction of NOx.

It is preferable that a ceramic honeycomb structure made of cordierite, mullite, aluminum titanate, etc. is used as a support for the preliminary catalyst for carrying the above mentioned catalyst activating components. Alternatively, it is preferable that a ceramic honeycomb forming a support is coated with a porous carrier such as silica, alumina, or titania for carrying the catalyst activating components thereon.

It is essential in the exhaust gas purifying system of the present invention to effectively use the heat which is generated by the combustion with the preliminary catalyst for heating the preliminary catalyst itself for activation. This can be achieved by decreasing the heat conductivity of the catalyst carrier and the support and by increasing the temperature gradient between the catalyst and the carrier or the support. The above mentioned ceramics have a low heat conductivity so that they effectively function to quickly elevate the temperature of the catalyst. A honeycomb made of an electrically conductive metal or alloy, such as stainless steel, may be used as a support for the preliminary catalyst.

Fast heating of the catalyst can be also achieved by reducing the specific heat of the catalyst carrier or support. A honeycomb made of a metal, such as stainless steel, is used as a support for the catalyst so that the specific heat of the material is decreased, thereby making it possible to form a thin plate of this material. As a result of this, the heat capacity can be made lower and faster elevation in temperature is enabled.

It is also preferable to heat the preliminary catalyst by conducting an electric current through the preliminary catalyst.

Elevation in temperature of the preliminary catalyst can be made faster by conducting an electric current through the catalyst carrier or support, which is made of a metal, for heating the catalyst by Joule heat. Elevation in temperature of the preliminary catalyst can be made faster by conducting an electric current through the catalyst on starting of the elevation in the temperature of the catalyst to promote the combustion of CO.

The present invention further provides a method of operating an internal combustion engine in which the engine is driven by supplying fuel and air thereto at the stoichiometric air/fuel ratio and an exhaust gas is purified with an exhaust gas purifying catalyst, comprising driving the engine under a condition in which the air-fuel mixture is richer than the amount determined by the stoichiometric air/fuel ratio for a period of time from when the engine is started until at least a time when the exhaust gas purifying catalyst is heated to a temperature at which the catalyst becomes active.

There is also provided a system for purifying an exhaust gas from an internal combustion engine in which the engine is started under a condition in which the air-fuel mixture is richer than the amount determined by the stoichiometric air/fuel ratio and the exhaust gas is catalytically combusted with a combustion catalyst and then fed to an exhaust gas purifying catalyst, and if the temperature of the exhaust gas purifying catalyst is elevated to a temperature at which the catalyst becomes active, supply of rich fuel is stopped and the exhaust gas is fed directly to said exhaust gas purifying catalyst without passing through the combustion catalyst.

An automobile of the present invention comprises an exhaust gas purifying catalyst in an exhaust gas passage from an internal combustion engine, means for supplying to said engine an air-fuel mixture which is richer than the amount determined by the stoichiometric air/fuel ratio for a period of time from when said engine is started until said exhaust gas purifying catalyst is heated to a temperature at which the catalyst exhibits activation; and a combustion catalyst disposed in said exhaust gas passage upstream of said exhaust gas purifying catalyst for catalytically combusting the exhaust gas emitted from said engine which is driven with the richer fuel.

The present invention is preferably applied to an automobile which is driven by a gasoline engine or a Diesel engine.

A system for purifying an exhaust gas from an internal combustion engine of the present invention includes a bypass passage for an exhaust gas passage leading from the engine to said exhaust gas purifying main catalyst and the bypass passage may include said preliminary catalyst made of a combustion catalyst.

The preliminary catalyst becomes substantially unnecessary after it functions for a short period of time (about 2 minutes) immediately after starting. Passing the exhaust gas through the preliminary catalyst also after it has become unnecessary will increase pressure loss. Exposure of the preliminary catalyst to high temperature for a long period of time may cause deterioration of the catalyst. A bypass is provided in an exhaust gas passage leading from an engine to the main catalyst and the preliminary catalyst is provided in the bypass. Combustion of a rich air-fuel mixture is performed only for a period of time while the main catalyst has not reached a working temperature immediately after starting of the engine. The exhaust gas is introduced to the main catalyst through the preliminary catalyst in this bypass. This can eliminate the above mentioned problems.

It is preferable to provide dehumidifying means, preferably a dehumidifier in the exhaust gas passage between the engine and the preliminary catalyst. If the temperature of the preliminary catalyst is not higher than the dew point of the exhaust gas, it is preferable to dehumidify the exhaust gas with the dehumidifying means, for example, by cooling the exhaust gas to a temperature equal to or lower than the temperature of the preliminary catalyst and then by supply of the dehumidified exhaust gas to the preliminary catalyst.

The engine exhaust gas usually contains a large quantity of water vapor. If the exhaust gas containing water vapor is supplied to the preliminary catalyst having a low temperature, precisely a temperature which is not higher than the dew point of the exhaust gas, the water content in the exhaust gas condenses on the catalyst or in the pores in the catalyst. This phenomenon may not only lower than the performance of the catalyst, but also may deteriorate the catalyst and will increase the pressure loss. Once the condensation occurs, latent heat for evaporating the condensate is necessary. Accordingly, much heat is necessary to elevate the temperature of the condensate and therefore a long period of time is required to heat the catalyst. Condensation of water vapor on the preliminary catalyst can be prevented by dehumidifying the exhaust gas, for example, by cooling the exhaust gas to a temperature equal or lower than the temperature of the preliminary catalyst and then supplying the dehumidified exhaust gas to the preliminary catalyst. In the exhaust gas purifying system in which a bypass is provided in an exhaust passage leading from the engine to the main catalyst and a combustion catalyst is provided in the bypass, it is preferable that exhaust gas dehumidifying means is provided in the bypass passage and when the temperature of the preliminary catalyst is not higher than the dew point of the combusted exhaust gas, the exhaust gas is dehumidified by dehumidifying means in the bypass and then introduced to the main catalyst, and when the temperature of the preliminary catalyst is not lower than the dew point of the exhaust gas, the exhaust gas is introduced directly to the preliminary catalyst.

When the temperature of the preliminary catalyst is not lower than the dew point of the exhaust gas, there is no possibility of condensation of water. Dehumidification of the exhaust gas is unnecessary under this condition. Accordingly, a bypass is provided in the passage of the exhaust gas leading from the engine to the main catalyst and exhaust gas dehumidifying means is provided in the bypass passage and when the temperature of the preliminary catalyst is not higher than the dew point of the combusted exhaust gas, the exhaust gas is dehumidified by dehumidifying means in the bypass and then introduced to the main catalyst and when the temperature of the preliminary catalyst is not lower than the dew point of the exhaust gas, the exhaust gas is introduced directly to the preliminary catalyst. In such a manner, condensation of water in the preliminary catalyst and problems associated therewith can be prevented without conducting unnecessary dehumidification.

A case in which an air-fuel mixture which is richer than the amount determined by the stoichiometric air/fuel ratio is supplied to an engine is shown in Japanese Unexamined Patent Publication Tokkai-Sho 61-58912. No countermeasure for the exhaust gas which is emitted at the initial phase of engine start is considered.

The present invention will now be described by way of embodiments with reference to drawings. However, it is to be understood that the present invention is not limited to only the described embodiments.

Referring now to FIG. 1, there is shown a schematic view showing an embodiment of a system for purifying exhaust gas from an internal combustion engine. An exhaust gas passage 11 from an engine 1 is provided with a preliminary catalytic converter 2 and a main catalytic converter 3. An air amount adjusting valve (throttle valve) 8 and a fuel injection valve 9 are provided in an intake pipe 4 of the engine 1. The opening of the air amount adjusting valve 8 and the fuel injection valve 9 is controlled by a control unit (control box) 10. A secondary air supply pipe 6 is provided at the previous stage of the preliminary catalytic converter 2 of the exhaust gas passage 11. The secondary air supply pipe 6 is provided with an air pump 5. A thermal sensor 7 is provided at the post stage of the main catalytic converter 3 to detect the temperature of the main catalyst and/or exhaust gas. The detected temperature is input to the control unit 10 where the control unit 10 determines whether or not rich fuel operation is continued by comparing the detected temperature with a preset value.

Figure 5:
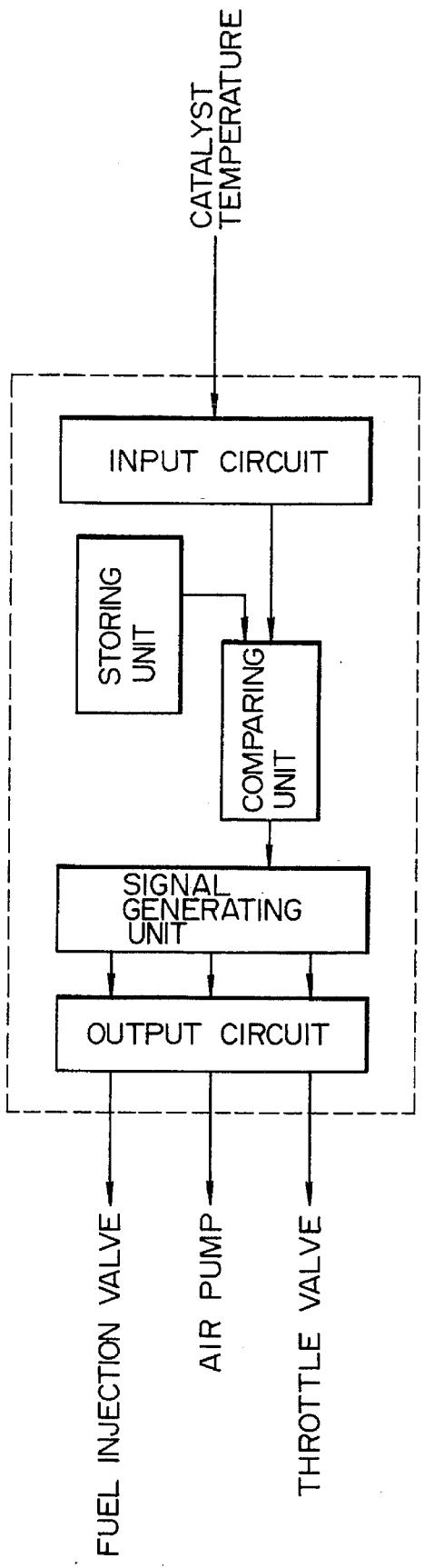
FIG. 5 is a block diagram showing the detailed structure of a control unit in the embodiment in FIG. 1.

The detailed structure of the control unit 10 in the embodiment shown in FIG. 1 is shown in FIG. 5. A signal from the thermal sensor 7 provided in the main catalytic converter 3 is transformed by an input circuit into a form suitable for comparison with the preset value of the catalyst temperature and then fed to a comparing unit in which it is compared with the preset catalytic converter temperature which has been preliminarily stored in a storing unit. If the temperature of the main catalytic converter 3 is lower than the preset value, a signal generator or signal generating unit generates a signal which will adjust the fuel injection value 9 and the throttle valve 8 to make the air-fuel mixture richer than the amount determined by the stoichiometric air/fuel ratio and also generates a signal which will turn on the air pump 5. These signals are transformed in the output circuit into forms suitable for respective output objects and fed to the fuel injection valve 9, the throttle valve 8 and the air pump 5.

If the temperature of the main catalytic converter 3 is higher than the preset value, the signal generating means generates a signal which adjusts the fuel injection valve 9 and the throttle valve 8 to make the air/fuel ratio equal to or approximate to the stoichiometric ratio and generates a signal which turns off the air pump. The signals are transformed in the output circuits into forms suitable for the respective output objects and are fed to the fuel injection valve 9, the throttle valve 8 and the air pump.

Figure 2:
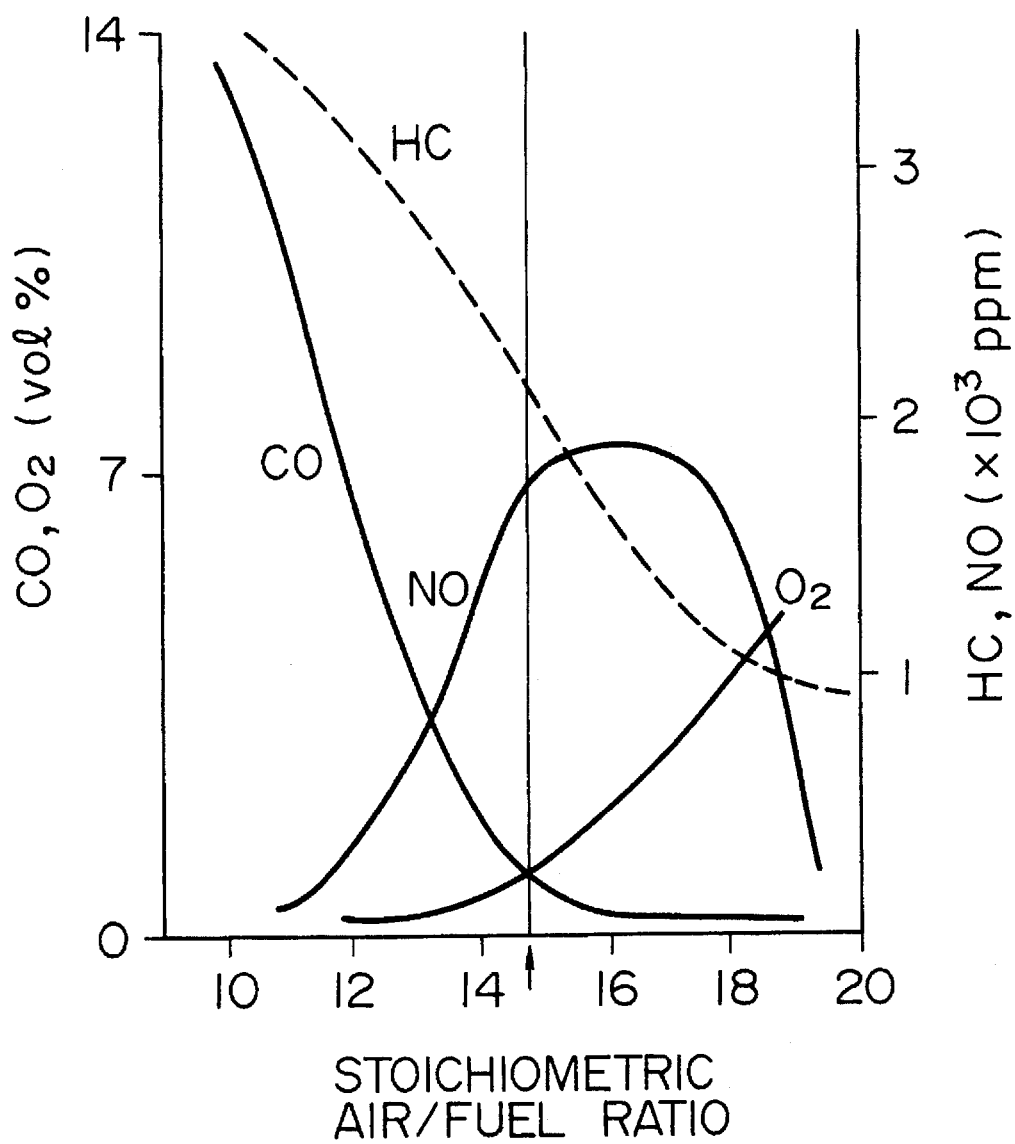
FIG. 2 is a graph showing the typical relation between the air/fuel ratio and the exhaust gas composition in a gasoline engine.

FIG. 2 shows the relation between the air/fuel ratio and the composition of the exhaust gas in a gasoline engine.

Figure 3:
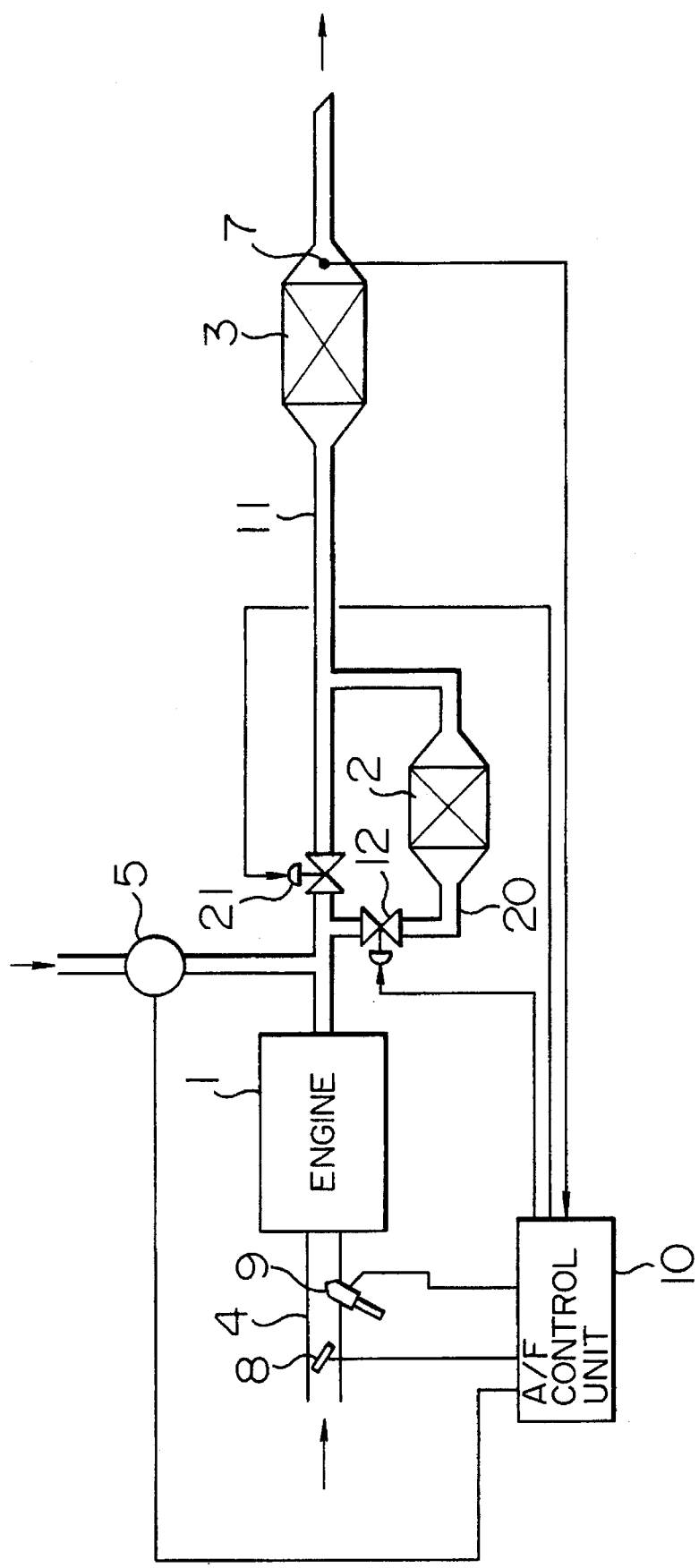
FIG. 3 is a schematic view showing another embodiment of a system for purifying an exhaust gas from an internal combustion engine.

Referring now to FIG. 3, there is shown a schematic view showing another embodiment of a system for purifying exhaust gas from an internal combustion engine in accordance with the present invention. A bypass passage 20 is provided in an engine exhaust gas passage, and a preliminary catalytic converter 2 is provided in the bypass passage. Valves 12 and 21 are provided to change the flow of the exhaust gas. The temperature of the main catalyst and/or exhaust gas at the exit of the main catalytic converter 3 is detected by a thermal sensor 7 and the signal from the sensor 7 representing the temperature of the main catalyst and/or the exhaust gas temperature is input to a control unit 10. If the detected temperature is equal to or lower than the active temperature of the main catalytic converter 3, the valve 21 is closed and the valve 12 is opened so that the exhaust gas is introduced to the preliminary catalytic converter 2 of the bypass passage 20, and simultaneously with this, an air amount adjusting valve 8 and a fuel injection valve 9 are controlled to perform combustion of a rich air-fuel mixture. When the temperature of the exhaust gas is not lower than the temperature of the main catalytic converter 3, the valves 21 and 12 are opened and closed, respectively, to introduce the exhaust gas directly to the main catalytic converter 3, and simultaneously with this, an intake air amount adjusting valve 8 and a fuel injection valve 9 are controlled to perform combustion under a condition of a stoichiometric air/fuel ratio or a value approximate thereto. Signals for opening and closing the valves 12 and 21 are also output from the control unit 10.

Figure 4:
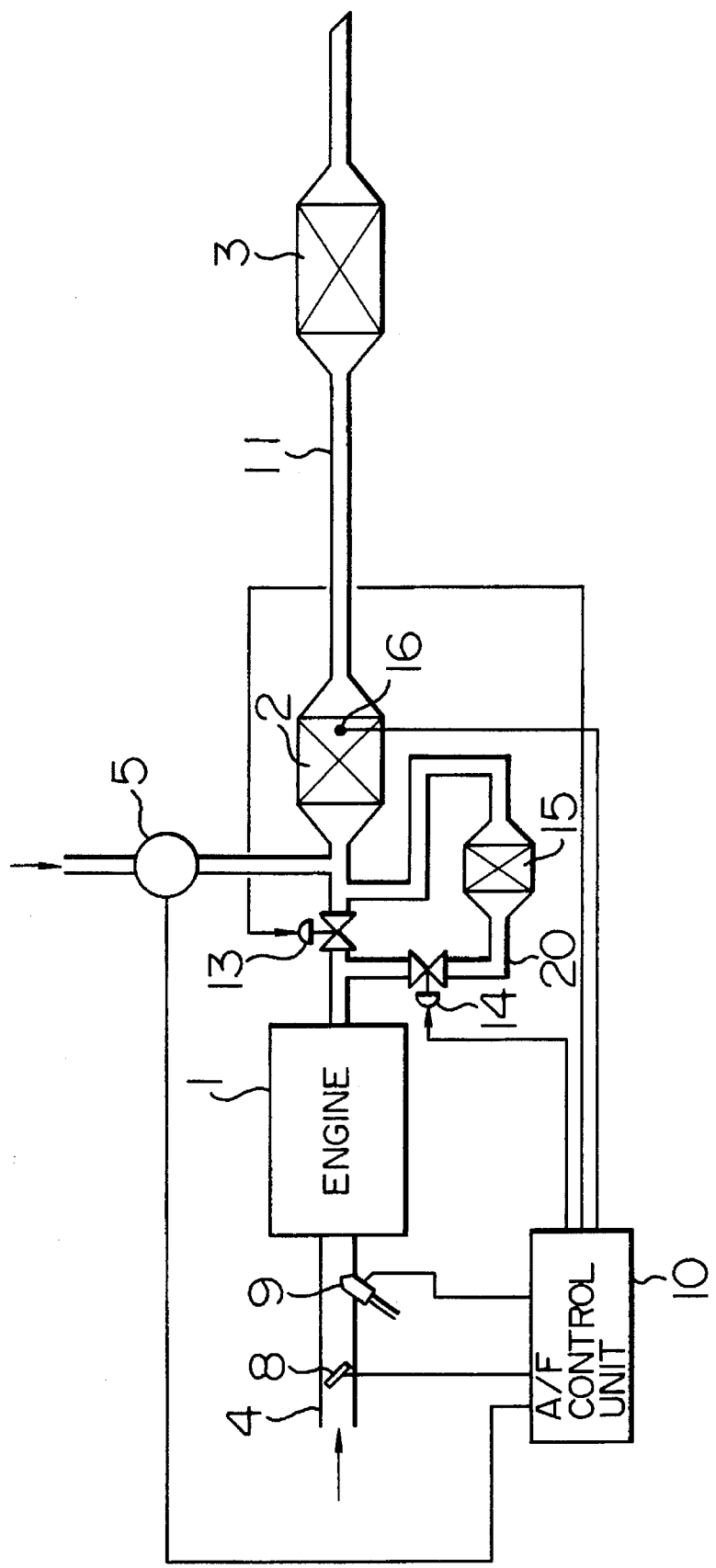
FIG. 4 is a schematic view showing a further embodiment of a system for purifying an exhaust gas from an internal combustion engine.

Referring now to FIG. 4, there is shown a schematic view of a further embodiment of a system for purifying an exhaust gas from an internal combustion engine. A bypass passage 20 is connected with an engine exhaust gas passage 11 and a dehumidifier 15 is provided in the bypass passage 20. Valves 13 and 14 for changing the flow of the exhaust gas are provided in the passage 11 and the bypass passage 20, respectively. A thermal sensor 16 is provided in the preliminary catalytic converter 2. If the temperature of the preliminary catalytic converter 2 is lower than the dew point of the exhaust gas, the exhaust gas is introduced to the main catalytic converter 3 after it has been dehumidified by the dehumidifier 15 in the bypass passage 20, such as by cooling the exhaust gas to a temperature equal to or lower than the temperature of the preliminary catalyst. If the temperature of the preliminary catalytic converter 2 is higher than the dew point of the exhaust gas, the exhaust gas is directly introduced to the preliminary catalytic converter 2. Opening and closing operation of the valves 13 and 14 is also carried out by the control unit 10. For example, the control unit 10 can output signals for opening or closing the valves 13 and 14 by comparing the temperature measured by the thermal sensor 16 with the dew point of the exhaust gas which has been preliminarily stored.

EXAMPLE 1

The preliminary catalytic converter 2 includes 0.5% by weight of Pd which is carried by a ceramic (coadielite) honeycomb carrier having a volume of 1 liter and an opening ratio of 76% which is coated with alumina. The main catalytic converter 2 comprises a honeycomb carrier having a volume of 2 liters and has the same structure and is made of the same material as the preliminary catalytic converter 2 which carries Pd, Pt and Rh. Exhaust gas from a gasoline engine was passed through the preliminary and main catalytic converter 2 and 3 which were in series connected. When the exhaust gas including 7% by volume of CO and 0.35% by volume of HC, which was obtained by combusting a fuel at an air/fuel ratio of 12 in which the air-fuel mixture was richer than that at the stoichiometric air/fuel ratio, was introduced to the preliminary catalyst 2 at a flow rate of 1000 liters per minute, the temperature of the exhaust gas at the exit of the preliminary catalytic converter reached 300° C. 63 seconds after the introduction of the exhaust gas. The temperature at the exit of the main catalytic converter 7 reached 300° C. 135 seconds after the introduction of the exhaust gas.

COMPARATIVE EXAMPLE 1

The exhaust gas including 0.9% by volume of CO and 0.2% by volume of HC which was obtained by combusting the fuel at an air/fuel ratio of 14.5, which was close to the stoichiometric air/fuel ratio, was introduced to the preliminary catalytic converter 2 at a flow rate of 1000 liters/minute. The temperature of the exhaust gas at the exits of preliminary and main catalytic converters 2 and 3 reached 300° C. 89 and 170 seconds after the introduction of the exhaust gas, respectively.

EXAMPLE 2

Preliminary and main catalytic converters which were the same as those in Example 1 were used. The exhaust gas which was generated at the same combustion condition (air/fuel ratio of 12) was supplied with air at 380 liters/minute before reaching the preliminary catalytic converter. The temperatures of the exhaust gas at the exits of the preliminary and main catalytic converters reached 300° C. 40 and 87 seconds respectively after the introduction of the exhaust gas thereto.

EXAMPLE 3

The period of time which was taken for the temperature of the exhaust at the exit of the preliminary catalytic converter to reach 300° C. was measured by using various catalysts under the same condition as that in Example 2. The results of Table 1 was obtained. Ceramic honeycomb carriers were used as carriers for preliminary and main catalysts. The carriers were coated with alumina to carry catalyst active components as shown in Table 1.

TABLE 1

| Catalysts* | Time taken for the temperature of exhaust gas at exit of preliminary catalytic converter to reach 300° C. (seconds) |
|---|---|
| Pd + Pt | 38 |
| Pd + Pt + Rh | 41 |
| Pd + Cu oxide | 42 |
| Pd + Sn | 42 |
| Pd + Co oxide | 40 |
| Pd + Ru | 39 |
| Pt + Zn | 43 |
| Pt + Ni oxide | 41 |
| Pt + Fe oxide | 43 |
| Ag + Mn oxide | 41 |

*The catalyst contains 0.5% by weight of metal and 15% by weight of metal oxide.

EXAMPLE 4

Preliminary catalytic converters including various porous carriers and supports which carried Pd and Pt were used under the same condition as that of Example 2. The results of Table 2 were obtained by measuring the time which is taken for the temperature of the exhaust gas at the exit of the preliminary catalytic converter to reach 300° C.

TABLE 2

| Catalyst* | Porous carrier | Support | Time taken for exhaust gas at exit of preliminary catalytic converter to reach 300° C. (seconds) |
|---|---|---|---|
| Pd | alumina (8% by weight) | cordierite (honeycomb) | 40 |
| Pd | titania (6% by weight) | cordierite (honeycomb) | 41 |
| Pt | silica (8% by weight) | aluminium titanate (honeycomb) | 42 |

*The catalyst includes 0.5% by weight of a metal which is carried by a carrier.

EXAMPLE 5

A preliminary catalytic converter comprising a honeycomb structure having a porosity of 50% and made of a ferrite stainless steel plate having a thickness of 0.05 mm, which carried 0.5% by weight of Pd, was used. The speed of elevation of the catalyst temperature was measured under the same condition as that of Example 2. The temperatures of the exhaust gas at the exits of the preliminary and main catalytic converters reached 300° C. after 36 and 83 seconds, respectively.

EXAMPLE 6

The same catalytic converter as that in Example 5 was used. D.C. power of 3 kW was conducted through the catalyst under the same condition as that in Example 3. The temperatures of the exhaust gas at the exits of the preliminary and main catalytic converts reached 300° C. after 28 and 62 seconds, respectively.

In accordance with the present invention, unburnt or partially burnt components of fuel which are emitted immediately after the starting of an internal combustion engine can be purified. Specifically, a preliminary catalytic converter is provided. The engine is started under a rich air-fuel mixture condition so that the temperature of the preliminary catalytic converter is quickly elevated by oxidizing the exhaust gas. Accordingly, the temperature of the main catalytic converter which is provided downstream of the preliminary catalytic converter can be elevated to a service temperature. This enhances the exhaust gas purifying ability immediately after starting of the internal combustion engine.

The present invention may be modified in a manner that, while a positional relationship in which the combustion catalyst is positioned at the upstream side of the exhaust gas passage and the exhaust gas purifying catalyst is positioned at the downstream side thereof is maintained, these catalysts are accommodated within a common casing such that they have the appearance of a single converter. In this arrangement, the heat generated by the combustion catalyst at the upstream side can be rapidly transmitted to the exhaust gas purifying catalyst at the downstream side, whereby the temperature of the catalyst at the downstream side can be effectively increased. Further, in this case, both the catalyst at the upstream side and the catalyst at the downstream side can be formed on a single substrate. To be more specific, two kinds of catalyst are coated on a single substrate of a porous ceramic having a honeycomb structure, for example, in a manner that the combustion catalyst is positioned at the upstream side of the exhaust gas flow and the exhaust gas purifying catalyst is positioned at the downstream side thereof. This is realized, for example, in a manner that the combustion catalyst is carried on the single substrate at the upstream side thereof and the exhaust gas purifying catalyst is carried thereon at the downstream side. The catalyst at the upstream side may be a combustion catalyst capable of oxidizing CO and HC, while the catalyst at the downstream side may be a three-way catalyst capable of simultaneously purifying CO, HC and NOx. According to the exhaust gas purifying apparatus with the above-described configuration, since both the combustion catalyst and the exhaust gas purifying catalyst are provided on a single substrate, the fabricating process for the apparatus can be simplified and the apparatus can be miniaturized.

Figure 6A:
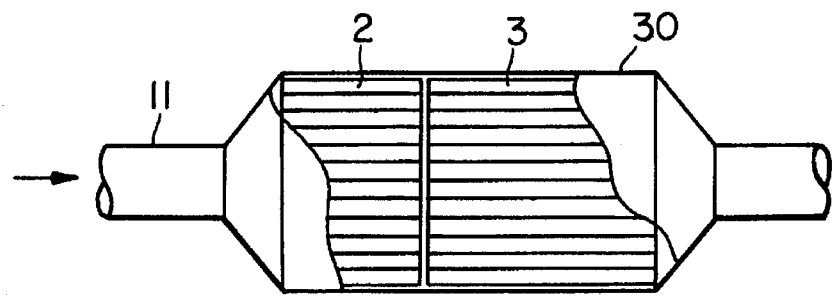
FIGS. 6A through 6C are detail views, partly in section, of various examples of exhaust gas purifying apparatus according to the present invention.
Figure 6B:
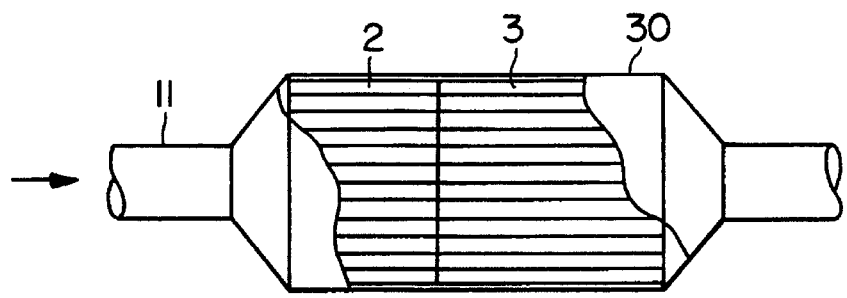
Figure 6C:
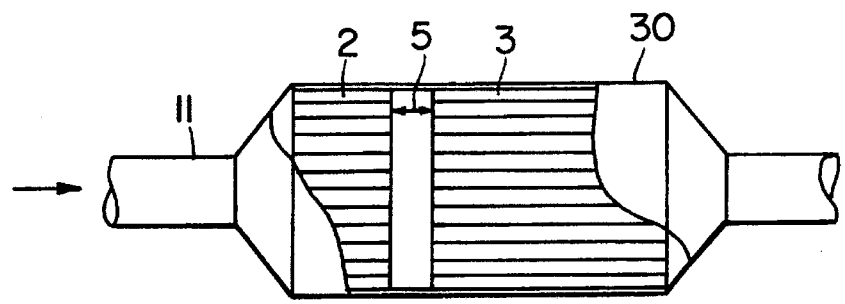

FIGS. 6A to 6C show various examples of the thus configured exhaust gas purifying apparatus according to the present invention.

In the example of FIG. 6A, the combustion catalyst 2 is coated on a substrate of porous ceramic having a honeycomb structure at the upstream side thereof and the exhaust gas purifying catalyst 3 is coated on another substrate of porous ceramic having a honeycomb structure at the upstream side thereof. These catalysts 2 and 3 are accommodated within a common casing 30.

In the example of FIG. 6B, the combustion catalyst 2 is coated on a single or common substrate of porous ceramic having honeycomb structure at the upstream side thereof and the exhaust gas purifying catalyst 3 is coated on the same substrate of porous ceramic having a honeycomb structure at the upstream side thereof. These catalysts 2 and 3 are accommodated within a common casing 30.

The example of FIG. 6C is similar to the example of FIG. 6B but differs only in that the catalysts 2 and 3 are formed on the common substrate with a space S therebetween, wherein no catalyst is coated.

Figure 7:
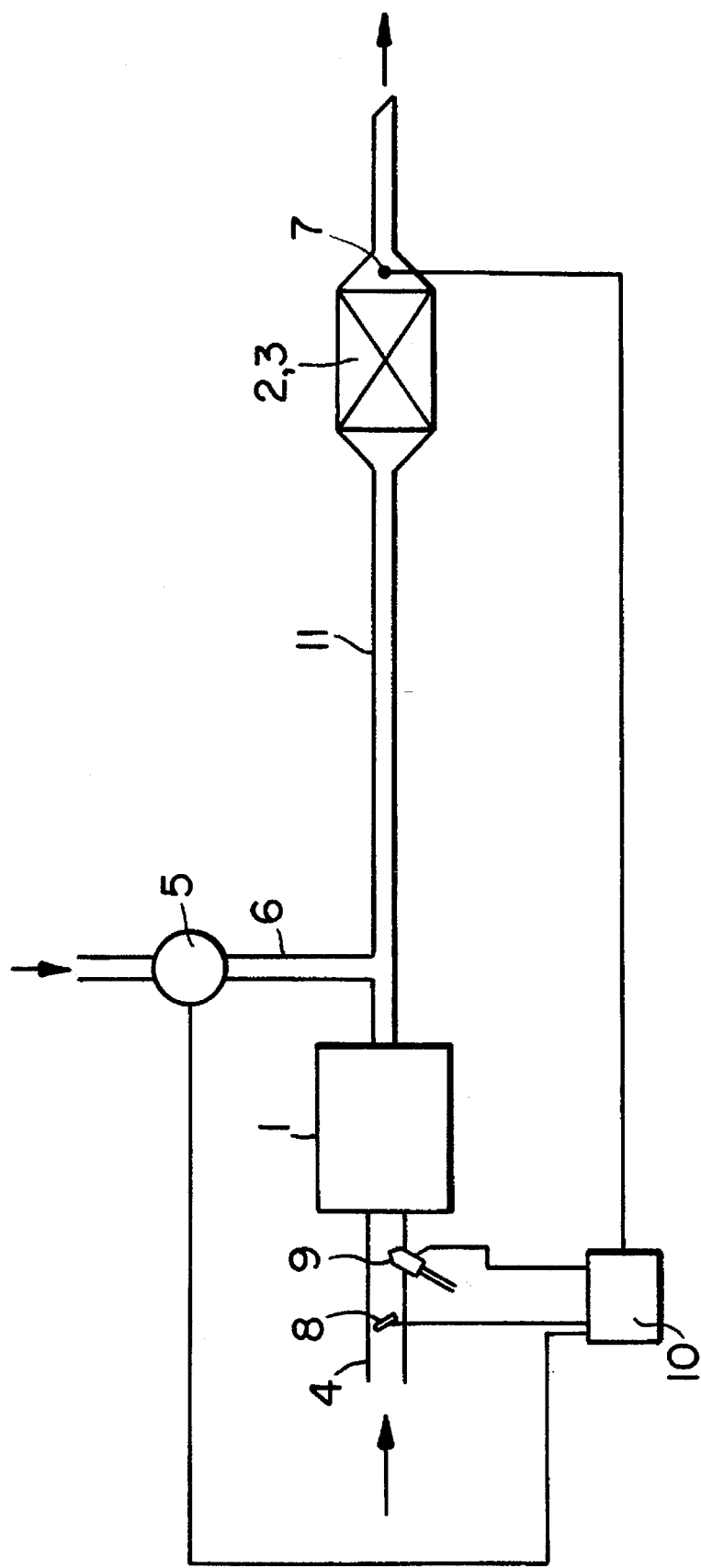
FIG. 7 is a schematic view of an embodiment of a system in the various exhaust gas purifying apparatus of FIGS. 6A to 6C may be used.

FIG. 7 shows an Example 7 of the present invention in which the exhaust gas purifying apparatus of any one of FIGS. 6A to 6C, for example, the apparatus of FIG. 6B is employed in the Example 1 instead of the catalysts 2 and 3 of the Example 1. In this case, both the catalysts 2 and 3 of FIG. 6B are same in the configurations and compositions with the catalysts 2 and 3 of the Example 1. In the thus configured Example 7, when the same procedure as that of the Example 2 is performed under the same condition, the temperature of exhaust gas at the main catalyst (exhaust gas purifying catalyst) 3 reached 300° C. upon the lapse of about 60 seconds after the start of the engine. The apparatus of FIGS. 6A to 6C may be applied to any one of the embodiments of FIGS. 1, 3 and 4.

We claim:

1. An apparatus for controlling an internal combustion engine including a fuel injection valve and an air amount adjusting valve which are disposed in an air intake system of the engine to control the supply of an air-fuel mixture to the engine and an exhaust system having a combustion catalyst for oxidizing CO and HC which is disposed in an upstream portion of the exhaust system and a three-way catalyst for simultaneously purifying CO, HC and NOx which is provided in a downstream portion of the exhaust system of the engine, comprising:

detecting means for detecting whether the temperature of said three-way catalyst is at a preset value representing the activation temperature thereof by detecting the temperature of one of said three-way catalyst and exhaust gas exiting said three-way catalyst;

means, responsive to the temperature of said three-way catalyst being lower than said preset value, for controlling the fuel injection valve and the air amount adjusting valve in said air intake system to maintain the air-fuel mixture supplied to said engine richer than the mixture determined by the stoichiometric air/fuel ratio until said temperature is raised to said preset value; and means, responsive to the temperature of said three-way catalyst being equal or higher than said preset value, for controlling the fuel injection valve and the air amount adjusting valve to make the air/fuel ratio equal or approximate to the stoichiometric air/fuel ratio.

2. An apparatus according to claim 1, further comprising:

a casing for accommodating said combustion catalyst and said three-way catalyst.

3. An apparatus according to claim 2 wherein said combustion catalyst includes a combustion catalyst portion provided on a single substrate and said three-way catalyst includes a three-way catalyst portion provided on the same single substrate.

4. An apparatus for controlling an internal combustion engine according to claim 1 wherein said combustion catalyst and said three-way catalyst are accommodated within a common casing in a manner that said combustion catalyst is disposed at an upstream side within said casing and said three-way catalyst is disposed at a downstream side within said casing.

5. An apparatus for controlling an internal combustion engine according to claim 1 wherein said combustion catalyst and said three-way catalyst are accommodated within a common casing in a manner that said combustion catalyst is disposed at an upstream side within said casing and said three-way catalyst is disposed at a downstream side within said casing, and wherein said combustion catalyst includes a combustion catalyst portion provided on a single substrate and said three-way catalyst includes a three-way catalyst portion provided on the same single substrate.

6. An apparatus for controlling an internal combustion engine including a fuel injection valve and an air amount adjusting valve which are disposed in an air intake system of the engine to control the supply of an air-fuel mixture to the engine and an exhaust system having a combustion catalyst for oxidizing CO and HC which is disposed in an upstream portion of the exhaust system and a three-way catalyst for simultaneously purifying CO, HC and NOx which is provided in a downstream portion of the exhaust system of the engine, comprising:

detecting means for detecting whether the temperature of said three-way catalyst is at a preset value representing the activation temperature thereof by detecting the temperature of one of said three-way catalyst and exhaust gas exiting said three-way catalyst;

means for comparing the temperature of one of said three-way catalyst and exhaust gas exiting the three-way catalyst with a preset value representing the activation temperature of the three-way catalyst;

means, responsive to said temperature being lower than said preset value, for generating a first signal to maintain the air-fuel mixture supplied to said engine richer than the mixture determined by the stoichiometric air/fuel ratio until the temperature of said exhaust gas purifying catalyst is raised to said preset value, and, responsive to said temperature being equal to or higher than said preset value, for generating a second signal to make the air/fuel ratio equal or approximate to the stoichiometric air/fuel ratio; and control means for opening or closing said fuel injection valve and said air amount adjusting valve in said air intake system in response to said first and second signals.

7. An apparatus for controlling an internal combustion engine as defined in claim 6 and further including means for opening or closing said fuel injection valve and said air amount adjusting valve in said air intake system to make the air/fuel ratio A/F (A and F represents the air and fuel weights, respectively) not lower than 10 and not higher than 13 when the temperature of said three-way catalyst is lower than said preset value.

8. An apparatus for controlling an internal combustion engine including a fuel injection valve and an air amount adjusting valve which are disposed in an air intake system of the engine to control the supply of an air-fuel mixture to the engine and an exhaust system having a combustion catalyst for oxidizing CO and HC which is disposed in an upstream portion of the exhaust system and a three-way catalyst for simultaneously purifying CO, HC and NOx which is provided in a downstream portion of the exhaust system of the engine, comprising:

detecting means for detecting whether the temperature of said three-way catalyst is at a preset value representing the activation temperature thereof by detecting the temperature of one of said three-way catalyst and exhaust gas exiting said three-way catalyst;

inputting means for inputting the temperature of one of said three-way catalyst and exhaust gas exiting the three-way catalyst;

means for storing a preset value;

means for comparing the temperature input from said inputting means with the preset value stored in said storing means;

means, responsive to said temperature being lower than said preset value, for generating a first signal to maintain the air-fuel mixture supplied to said engine richer than the mixture determined by the stoichiometric air/fuel ratio until the temperature of said exhaust gas purifying catalyst is raised to said preset value, and, responsive to said temperature being equal to or higher than said preset value, for generating a second signal to make the air/fuel ratio equal or approximate to the stoichiometric air/fuel ratio; and control means for opening or closing said fuel injection valve and said air amount adjusting valve in said air intake system in response to said first and second signals.

9. An apparatus for controlling an internal combustion engine having a fuel injection valve and an air amount adjusting valve disposed in an intake air system of the engine to control the supply of an air-fuel mixture to the engine, a combustion catalyst for oxidizing CO and HC and an exhaust gas purifying catalyst for simultaneously purifying CO, HC and NOx disposed at front and rear stages, respectively, of an exhaust system and air supplying means disposed upstream of said combustion catalyst, comprising:

detecting means for detecting whether the temperature of said three-way catalyst is at a preset value representing the activation temperature thereof by detecting the temperature of one of said three-way catalyst and exhaust gas exiting said three-way catalyst;

means, responsive to the temperature of one of said three-way catalyst and exhaust gas exiting that three-way catalyst being lower than a preset value, for generating a first signal which maintains the air-fuel mixture supplied to said engine richer than the mixture determined by the stoichiometric air/fuel ratio and for supplying air to said combustion catalyst until the temperature of said one of said exhaust gas purifying catalyst and exhaust gas exiting that catalyst is raised to said preset value, and, responsive to said temperature being equal to or higher than said preset value, for generating a second signal to make the air/fuel ratio equal or approximate to the stoichiometric air/fuel ratio and for stopping the supply of air to said combustion catalyst; and means for opening or closing said fuel injection valve and said air amount adjusting valve disposed in said air intake system and for turning on or off said air supplying means in response to said first and second signals.

10. A method of controlling an internal combustion engine including a fuel injection valve and an air amount adjusting valve which are disposed in an air intake system of the engine to control the supply of an air-fuel mixture to the engine and an exhaust system having a combustion catalyst for oxidizing CO and HC which is disposed in an upstream portion of the exhaust system and a three-way catalyst for simultaneously purifying CO, HC and NOx which is provided in a downstream portion of the exhaust system of the engine, comprising the steps of:

detecting when the temperature of said three-way catalyst is lower than a preset value representing the activation temperature thereof;

controlling the fuel injection valve and the air amount adjusting valve in said air intake system to maintain the air-fuel mixture supplied to the engine richer than the mixture determined by the stoichiometric air/fuel ratio until said temperature is raised to said preset value; and controlling the fuel injection valve and the air amount adjusting valve in said intake system to make the air-fuel mixture supplied to the engine equal or approximate to the stoichiometric air/fuel ratio, when said temperature is equal to or above said preset value.

11. A system for purifying an exhaust gas from an internal combustion engine having a fuel injection valve and an air amount adjusting valve in an air intake system of the engine to control the supply of an air-fuel mixture to the engine and a combustion catalyst for oxidizing CO and HC provided as a preliminary catalyst and a three-way catalyst for simultaneously purifying CO, HC and NOx in a downstream portion in an exhaust system of the engine, comprising:

detecting means for detecting whether the temperature of said three-way catalyst is at a preset value representing the activation temperature thereof by detecting the temperature of one of said three-way catalyst and exhaust gas exiting said three-way catalyst;

control means for actuating said fuel injection valve and said air amount adjusting valve to maintain the air-fuel mixture supplied to the engine richer than the mixture determined by the stoichiometric air/fuel ratio for a period of time from when the engine is started until the temperature of said three-way catalyst is elevated to a temperature at which the three-way catalyst exhibits activation and to set the air/fuel ratio equal or approximate to the stoichiometric air/fuel ratio when the temperature of said three-way catalyst is at the temperature at which the three-way catalyst exhibits activation.

12. A system for purifying an exhaust gas from an internal combustion engine as defined in claim 11 and further including a bypass passage for bypassing a portion of an exhaust gas passage leading from the engine to said three-way catalyst, said bypass passage having said preliminary catalyst disposed therein.

13. A system for purifying an exhaust gas from an internal combustion engine as defined in claim 12 and further including means for switching said exhaust gas passage so that exhaust gas is caused to flow to said three-way catalyst through said preliminary catalyst in said bypass passage while the air-fuel mixture which is richer than the mixture determined by the stoichiometric air/fuel ratio is supplied to said engine, and so that the exhaust gas is caused to flow directly to said three-way catalyst without passing through said bypass passage when supply of the richer air-fuel mixture to the engine is stopped.

14. A system for purifying an exhaust gas from an internal combustion engine as defined in claim 11 in which means for supplying an oxidizing agent to the exhaust gas is provided upstream of said preliminary catalyst in said exhaust system.

15. An automobile having a three-way catalyst for simultaneously purifying CO, HC and NOx in an exhaust gas passage from an internal combustion engine having a fuel injection valve and an air amount adjusting valve in an air intake passage thereof, comprising:

detecting means for detecting whether the temperature of said three-way catalyst is at a preset value representing the activation temperature thereof by detecting the temperature of one of said three-way catalyst and exhaust gas exiting said three-way catalyst;

means for supplying to said engine an air-fuel mixture which is richer than the mixture determined by the stoichiometric air/fuel ratio for a period of time from when said engine is started until said three-way catalyst is heated to the temperature at which the catalyst exhibits activation by controlling at least one of said fuel injection valve and said air amount adjusting valve;

a combustion preliminary catalyst disposed in said exhaust gas passage upstream of said exhaust gas purifying catalyst for contact-combusting the exhaust gas emitted from said engine which is supplied with the richer air-fuel mixture; and means, responsive to the temperature of said three-way catalyst being equal or higher than said preset value, for controlling the fuel injection valve and the air amount adjusting valve to make the air/fuel ratio equal or approximate to the stoichiometric air/fuel ratio.

16. An automobile having a three-way catalyst in an exhaust gas passage from an internal combustion engine as defined in claim 15 and further including means for heating said preliminary catalyst.

17. An automobile having a three-way catalyst in an exhaust gas passage from an internal combustion engine as defined in claim 15 and further including dehumidifying means in said exhaust gas passage leading from said engine to said preliminary catalyst.

18. An automobile having a three-way catalyst in an exhaust gas passage from an internal combustion engine as defined in claim 15 and further including dehumidifying means at a post stage of said preliminary catalyst in said bypass passage for dehumidifying the exhaust gas when the temperature of said preliminary catalyst is equal to or lower than the dew point of the exhaust gas, so that dehumidified exhaust gas is introduced to said exhaust gas purifying main catalyst.

* * * * *